United States Patent [19]

Reiff

[11] 4,455,906
[45] Jun. 26, 1984

[54] GATE SHEARS

[75] Inventor: Harro Reiff, Schloss, Fed. Rep. of Germany

[73] Assignee: Karl Mengele & Söhne, Gunzburg, Fed. Rep. of Germany

[21] Appl. No.: 316,969

[22] Filed: Oct. 30, 1981

[51] Int. Cl.³ .................... B23D 15/08; B23D 33/02
[52] U.S. Cl. ........................................ 83/438; 83/277; 83/418; 83/436
[58] Field of Search ................ 83/277, 279, 732, 438, 83/436, 419, 418, 270, 282, 408, 402, 206

[56] References Cited

U.S. PATENT DOCUMENTS

| 2,039,017 | 4/1936 | McLeod | 83/418 X |
| 2,809,696 | 10/1957 | Miller | 83/438 |
| 3,033,067 | 5/1962 | Thumim | 83/206 |
| 3,306,145 | 2/1967 | Edwards | 83/206 X |
| 3,995,521 | 12/1976 | Raphael | 83/436 X |

Primary Examiner—Frank T. Yost
Attorney, Agent, or Firm—Toren, McGeady and Stanger

[57] ABSTRACT

Sheet metal shears are located at one end of a table over which sheet metal is moved toward the shears. A lateral stop of positioned along one of the table edges extending transversely of the shears. The table surface is inclined downwardly toward the lateral stop. Clamping members are located adjacent to and are movable along the edge where the lateral stop is located.

5 Claims, 2 Drawing Figures

GATE SHEARS

The object of the invention is accordingly to avoid these disadvantages and provide, without great expense, a guidance of the metal sheets on the lateral stop means of the table that is effective under all circumstances.

This object of the invention is achieved in that either the whole shears together with the shearing table is inclined to the vertical, e.g. by means of a platform on the opposite side with the lateral stop means, or, by lowering the shears on the stop means side of the table below the base level, the shears run-in table together with the lower blade is so inclined to the vertical that it forms a plane inclined towards its lateral stop means.

According to another embodiment of the invention, the lower blade together with the shearing table is arranged inclined in the shears frame so that the shears run-in table forms a plane inclined downwardly towards its lateral stop means.

The angle of inclination of the table with respect to the horizontal is approximately 10° to 25°.

Figure 1:
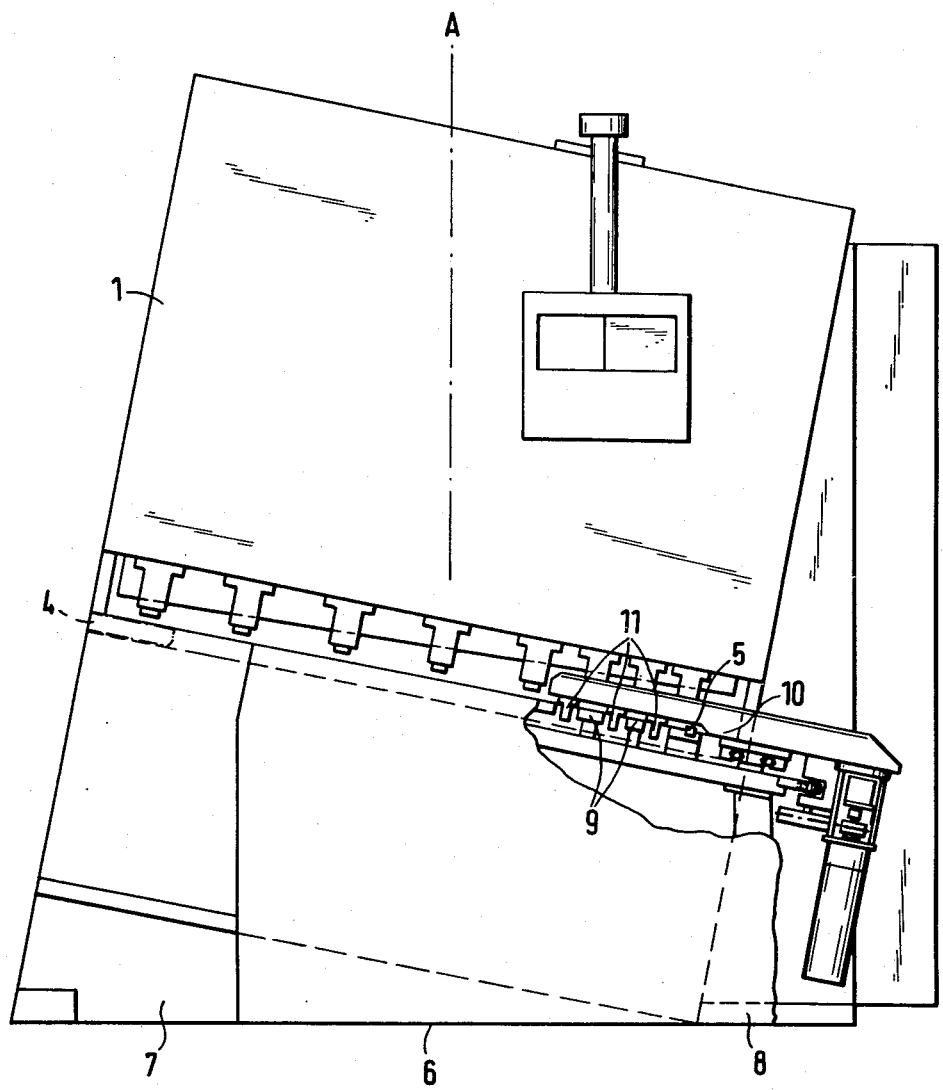
Figure 2:
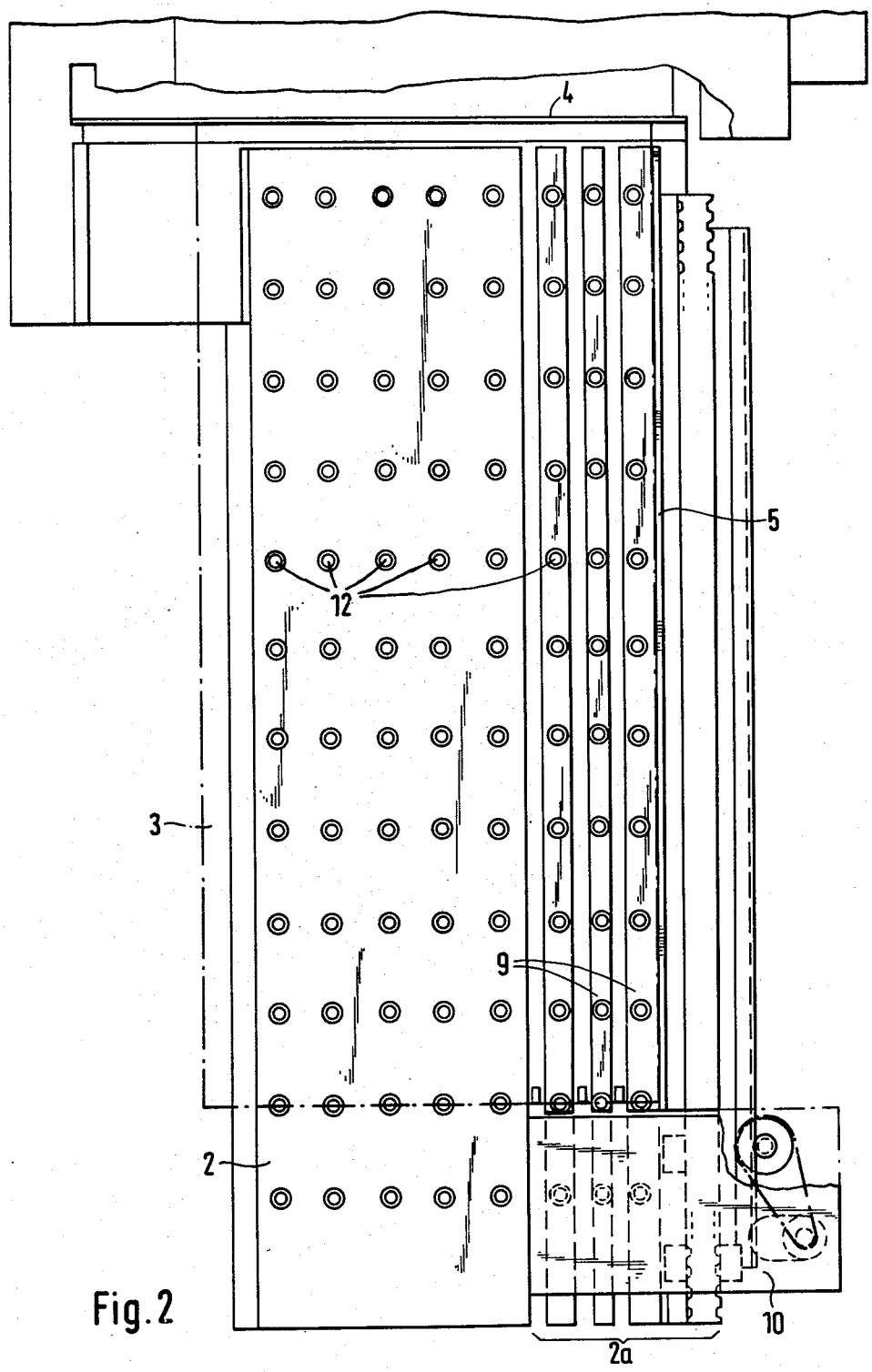

On the basis of an embodiment of a sheet metal shears, the invention is explained and described in more detail in the drawing, in which FIG. 1 is a diagrammatic view of the sheet metal shears according to the invention, from the feed side; and FIG. 2 is a top view of the run-in table.

In the drawing the reference numeral 1 denotes a shears frame, 2 denotes a shears run-in table, and 3 denotes a metal sheet lying on the shearing table. Of the blades, the lower blade 4 can be seen. The lateral stop means on the shears run-in table 2 is marked 5.

According to the invention, the whole shears 1 together with the shears run-in table 2 and blades (lower blade 4) is inclined in such a way to the vertical A that the shears run-in table 2 forms a plane inclined downwardly towards its lateral stop means 5. This inclination is effected in the embodiment in a simple manner by means of a pedestal 7 anchored to the base 6 on the left-hand side under the shears frame 1. The shears frame is secured to the pedestal 7, the other side of the shears frame 1 being held by a block 8 mounted on the base 6.

According to the invention, on the shears run-in table 2 only a small table section 2a placed on the lateral stop means side 5 is formed from lattice bars 9, between which engage collets 11 arranged on a carriage 10.

Sliding spheres 12 are arranged on the surface of the run-in table 2 and of the lattice bars 9.

The metal sheets (denoted by 3) placed on the shears run-in table 2 rest under their own weight on the underlying lateral stop means 5. Even if the rear edge of the sheet is gripped non-uniformly by the collets 11, the metal sheet 3 cannot consequently slide off or to one side, and accordingly a cut is ensured which is true to measure.

I claim:

1. In sheet metal gate shears a shears run-in table for feeding metal sheets to the shears having a pair of opposite ends and a pair of sides extending between said ends, said sheet metal shears comprises a movable upper shear blade and a lower stationary shear blade located at one end of said table, said table having a pair of opposite sides extending in the direction of movement of the sheets over said table toward the shears, lateral stop means for said shears run-in table extending along one of said pair of sides, characterized in that said table and said lower blade (4) are inclined downwardly toward said lateral stop means (5), said lateral stop means extends along the length of said one of said pair of sides from said lower blade, said table having a first section (2a) extending along and adjacent to said lateral stop means and a second section considerably wider than said first section extending for the remainder of the width of said table between said pair of sides thereof, clamping means located only in said section (2a) situated adjacent to said lateral stop means (5), and said section (2a) of said table (2) adjacent to said stop means arranged so that said clamping means can be moved along in the direction in which said one of said pair of said sides extends.

2. In gate shears, according to claim 1, characterized in that the angle of inclination of said table and of said lower blade with respect to the horizontal is 10° to 25°.

3. In gate shears, according to claim 1, including means in said table for assisting the sliding action of the metal sheets over said table.

4. In gate shears, according to claim 7, characterized in that said sliding means are spheres located in spaced relation in said first and second sections of said table.

5. In gate shears, according to claim 2, including laterally spaced lattice bars (9) extending in the direction of said pair of sides forms said first section (2a) of said table (2), and said clamping means (11) comprises a carriage mounted relative to said lattice bars so that said clamping means can be moved between said lattice bars.

* * * * *